(12) United States Patent
Markert et al.

(10) Patent No.: US 12,512,915 B2
(45) Date of Patent: Dec. 30, 2025

(54) TRANSCEIVER MODULE (71) Applicant: Rohde & Schwarz GmbH & Co. KG, Munich (DE)

(72) Inventors: Daniel Markert, Berg (DE); Maximilian Saalfeld, Munich (DE)

(73) Assignee: ROHDE & SCHWARZE GMBH & CO. KG, Munich (DE)

(*) Notice: Subject to any disclaimer, the term of this patent is extended or adjusted under 35 U.S.C. 154(b) by 386 days.

(21) Appl. No.: 18/091,107

(22) Filed: Dec. 29, 2022

(65) Prior Publication Data

US 2023/0254051 A1    Aug. 10, 2023

(30) Foreign Application Priority Data

Feb. 4, 2022   (EP) ..................... 22155182

(51) Int. Cl.
*H04B 17/10* (2015.01)
*H04B 17/21* (2015.01)

(52) U.S. Cl.
CPC ........... *H04B 17/101* (2015.01); *H04B 17/21* (2015.01)

(58) Field of Classification Search
CPC .............................. H04B 17/101; H04B 17/21
See application file for complete search history.

(56) References Cited

U.S. PATENT DOCUMENTS

| 5,751,153 A | 5/1998 | Bockelman et al. |
| 7,693,040 B1 * | 4/2010 | Bhugra .............. H04L 5/0007 370/476 |
| 9,945,900 B1 | 4/2018 | Wang et al. |
| 2007/0053311 A1 | 3/2007 | Kim et al. |
| 2008/0029848 A1 | 2/2008 | Pei et al. |

(Continued)

FOREIGN PATENT DOCUMENTS

| EP | 3 462 620 A1 | 4/2019 |
| JP | 2016192756 A | 11/2016 |
| WO | 2011066766 A1 | 6/2011 |

OTHER PUBLICATIONS

Office Action for related European Patent Application No. 22155182.3-1001, dated Aug. 2, 2022, 11 pages.

(Continued)

*Primary Examiner* — Duc C Ho
(74) *Attorney, Agent, or Firm* — DITTHAVONG, STEINER & MLOTKOWSKI (57) ABSTRACT

The invention relates to a transceiver module for connecting an RF apparatus with one or more RF devices. The transceiver module comprises a baseband interface which is connectable to the RF apparatus for bidirectional communication of baseband signals, one or more RF interfaces, wherein each one of the RF interfaces is connectable to one of the RF devices, and a switching unit configured to convert baseband signal received at the baseband interface into one or more RF signals and to forward said RF signals to at least one of the RF interfaces according to a flexible mapping and vice versa. The transceiver module further comprises a control unit configured to control the switching unit, and a control interface which is connectable to the RF apparatus to receive control commands from the RF apparatus, wherein the control unit is configured to adapt the flexible mapping of the switching unit based on the received control commands.

14 Claims, 6 Drawing Sheets

(56) References Cited

U.S. PATENT DOCUMENTS

| | | |
|---|---|---|
| 2008/0082877 A1 | 4/2008 | Hung et al. |
| 2010/0158088 A1 | 6/2010 | Kim et al. |
| 2010/0271953 A1 | 10/2010 | Kim et al. |
| 2010/0317387 A1* | 12/2010 | O'Keeffe ............ H04N 21/6168 |
| | | 455/507 |
| 2011/0075616 A1 | 3/2011 | Baldwin et al. |
| 2016/0212641 A1* | 7/2016 | Kong ................ H04B 17/0087 |

OTHER PUBLICATIONS

"Agilent: Test Equipment Solutions Datasheet", Oct. 29, 2010, pp. 1-17.

* cited by examiner

TRANSCEIVER MODULE

TECHNICAL FIELD OF THE INVENTION

The invention relates to a transceiver module as well as a system and a method for connecting a radio frequency (RF) apparatus, such as an RF signal generator, with a plurality of RF devices.

BACKGROUND OF THE INVENTION

Many RF measurement setups comprise an RF measurement apparatus, such as a signal generator, which is connected to a plurality of RF devices, e.g. devices-under-test (DUTs), via a number of signal paths. The devices are thereby connected to a number of dedicated ports of the RF apparatus.

However, sometimes the number of ports respectively signal paths provided by the RF measurement apparatus is not sufficient. In such cases, several RF apparatuses can be coupled and operated together which, however, increases the cost and complexity of the measurement setup.

Thus, it is an objective to provide additional signal paths for an RF apparatus in a cost efficient way.

SUMMARY OF THE INVENTION

The object of the present invention is achieved by the solution provided in the enclosed independent claims. Advantageous implementations of the present invention are further defined in the dependent claims.

According to a first aspect, the invention relates to a transceiver module for connecting an RF apparatus with one or more RF devices. The transceiver module comprises a baseband interface which is connectable to the RF apparatus for bidirectional communication of baseband signals; and one or more RF interfaces, wherein each one of the RF interfaces is connectable to one of the RF devices. The transceiver module further comprises a switching unit which is configured to convert a baseband signal received at the baseband interface into one or more RF signals and to forward said RF signals to at least one of the RF interfaces according to a flexible mapping and vice versa; a control unit configured to control the switching unit; and a control interface which is connectable to the RF apparatus to receive control commands from the RF apparatus, wherein the control unit is configured to adapt the flexible mapping of the switching unit based on the received control commands.

This achieves the advantage that additional interfaces can be provided for the RF apparatus in a cost efficient way. Thus, the number of RF devices that can be connected to a single RF apparatus for exchanging RF signals can drastically be increased without adapting the hardware of the RF apparatus itself.

The RF apparatus can be a signal source, a signal sink, a signal generator, an oscilloscope or a signal analyzer. In particular, the RF apparatus is an RF measurement apparatus or an RF instrument.

The RF devices can comprise: RF antennas, up-down converters, electronic devices, such as user equipment or DUTs, or any other device suitable for connecting to one of the RF interfaces for receiving and/or providing RF signals.

The baseband signal can be a baseband representation of an RF signal.

Preferably, the baseband signal comprises baseband data, in particular digital data (i.e., digital baseband data). The baseband signal can be transferred over the baseband interface in the form of a digital signal.

The baseband signal can be an IQ signal, i.e. a signal comprising IQ data. The IQ signal can comprise an In-phase (I) and a quadrature (Q) component. The IQ signal can comprise a plurality of IQ streams.

The RF signals can be analog signals. The switching unit can be configured to convert the digital baseband signal, in particular the digital IQ signal comprising the IQ data, to the analog RF signals.

In particular, the baseband interface and/or the RF interfaces are bidirectional interfaces, i.e. suitable for sending and receiving data, respectively signals.

In particular, the transceiver module comprises a plurality of RF interfaces. Each of the plurality of RF interfaces can be connectable to an RF device.

The baseband interface and/or the RF interfaces can be wire-bound interfaces.

In an embodiment, the switching unit is configured to establish at least one signal path between the RF apparatus and at least one of the RF devices based on the flexible mapping.

In particular, the switching unit can be configured to demultiplex a received baseband signal into a plurality of RF signals, and to forward each of the plurality of RF signals to one of the RF interfaces (for forwarding to connected RF devices). At the same time, the switching unit can be configured to multiplex a plurality of received RF signals into a single baseband signal and to forward said baseband signal to the baseband interface (for forwarding to the RF apparatus). Thus, the transceiver module may allow for an adaptive control of a (de)multiplexing of a digital baseband signal to RF channels and vice versa. This multiplexing and demultiplexing can be specified by the flexible mapping.

In particular, the flexible mapping defines a flexible and changeable mapping respectively allocation which can also be maintained statically for a longer period of time until the transceiver module is reconfigured. For instance, a user can specify, e.g. via an interface of the RF apparatus or the transceiver device, how a number of output signals of the RF apparatus are distributed to the output channels of the transceiver module.

In an embodiment, the baseband interface is an Ethernet interface.

In particular, the baseband interface is a physical Ethernet interface that operates according to a dedicated protocol for baseband signals (e.g., IQ signals).

In an embodiment, the control interface is an Ethernet interface.

In an embodiment, the control interface and the baseband interface form a single physical interface. This achieves the advantage that the complexity of the transceiver module is reduced.

In an embodiment, the transceiver module comprises at least one further baseband interface which is connectable to a further RF apparatus for bidirectional communication with the transceiver module.

In particular, the further baseband interface can be configured for a bidirectional communication of further baseband signal with the further RF apparatus. For instance, the switching unit is configured to convert the further baseband signal received at the further baseband interface into RF signals and to forward said RF signals to at least one of the RF interfaces according to the flexible mapping and vice versa.

In an embodiment, the transceiver module further comprises a signal processing unit, in particular an RF fader, which is configured to additionally modify the baseband signal and/or the RF signals.

The control unit can be configured to control the signal processing unit based on the control commands.

In an embodiment, the switching unit comprises at least one analog-to-digital converter (ADC) and at least one digital-to-analog converter (DAC).

For instance, the IQ signal is a digital signal and the RF signals are analog signals. The ADC can be configured to convert baseband signal received from the RF apparatus into RF signals, and/or the DAC can be configured to convert RF signals received from the RF devices into baseband signal.

In particular, the switching unit comprises one ADC and one DAC for each signal path between the RF apparatus and one of the RF devices.

According to a second aspect, the invention relates to a system comprising the transceiver module according to any one of the preceding claims; and an RF apparatus which is connected to the baseband interface of the transceiver module.

In an embodiment, the RF apparatus is any one of: a signal source, a signal sink, a signal generator, an oscilloscope or a signal analyzer.

According to a third aspect, the invention relates to a method for connecting an RF apparatus with one or more RF devices, the method comprising:
- providing a baseband interface which is connectable to the RF apparatus for bidirectional communication of baseband signal;
- providing one or more RF interfaces, wherein each one of the RF interfaces is connectable to one of the RF devices;
- converting a baseband signal received at the baseband interface into one or more RF signals and forwarding said RF signals to at least one of the plurality of RF interfaces according to a flexible mapping and vice versa;
- receiving control commands from the RF apparatus; and
- adapting the flexible mapping based on the received control commands.

Preferably, the method according to the third aspect of the invention can be carried out by the transceiver module according to the first aspect of the invention and/or the system according to the second aspect of the invention.

In an embodiment, at least one signal path is established between the RF apparatus and at least one of the RF devices based on the flexible mapping.

In an embodiment, the baseband signal and the control commands are received at the same physical interface. This single physical interface can be an Ethernet interface.

In an embodiment, the method further comprises the step of: additionally modifying the baseband signal and/or the RF signals, in particular by means of an RF fader.

The above description with regard to the transceiver module according to the first aspect of the invention and the system according to the second aspect of the invention is correspondingly valid for the method according to the third aspect of the invention.

BRIEF DESCRIPTION OF THE DRAWINGS

The invention will be explained in the following together with the figures.

DETAILED DESCRIPTION OF THE PREFERRED EMBODIMENTS

Figure 1:
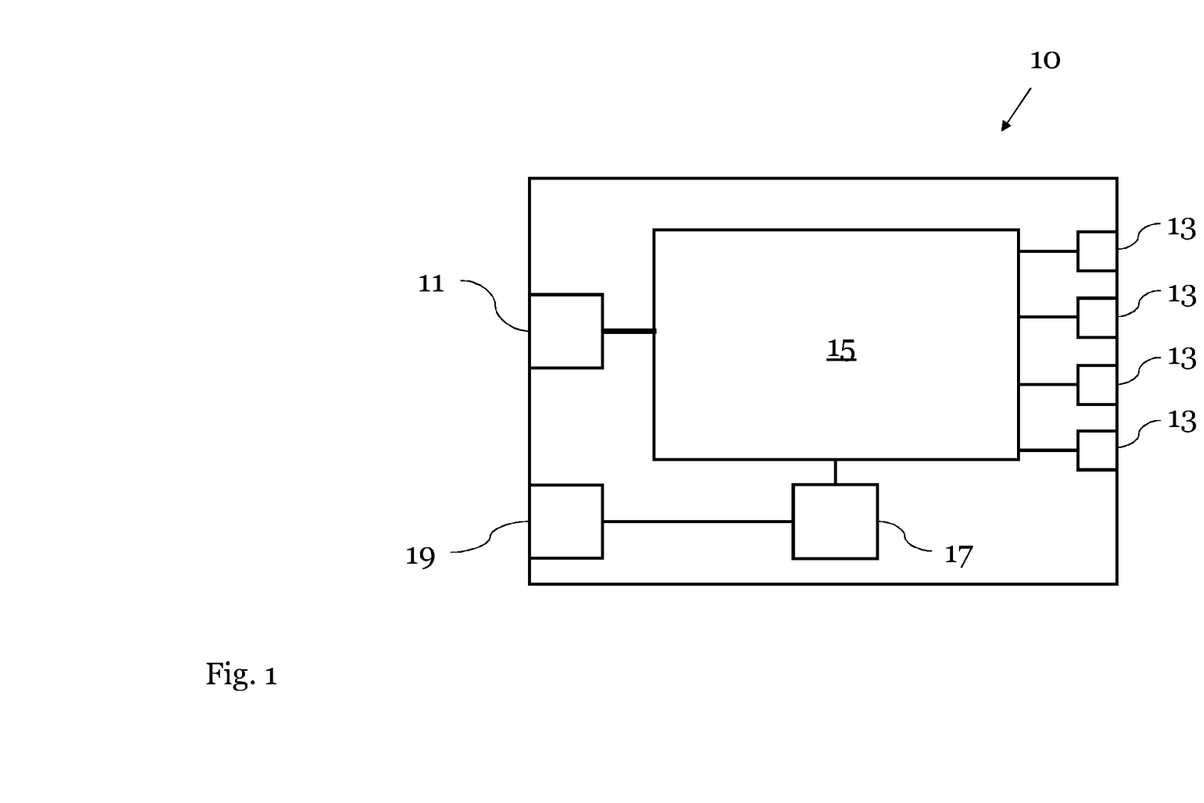
FIG. 1 shows a schematic diagram of a transceiver module according to an embodiment.

FIG. 1 shows a schematic diagram of a transceiver module 10 for connecting an RF apparatus with one or more RF devices according to an embodiment.

The transceiver module 10 comprises a baseband interface 11 which is connectable to the RF apparatus for bidirectional communication of baseband signals with the RF apparatus, one or more RF interfaces 13, wherein each one of the RF interfaces 13 is connectable to one of the RF devices, and a switching unit 15 configured to convert a baseband signal received at the baseband interface 11 into one or more RF signals and to forward said RF signals to at least one of the RF interfaces 13 according to a flexible mapping, and vice versa. The transceiver module 10 further comprises a control unit 17 configured to control the switching unit 15, and a control interface 19 which is connectable to the RF apparatus and is configured to receive control commands from the RF apparatus, wherein the control unit 17 is configured to adapt the flexible mapping of the switching unit 15 based on the received control commands.

In particular, the switching unit 15 is configured:
- to convert a baseband input signal received at the baseband interface 11 into one or more RF output signals and to forward each of the one or more RF output signals to one of the RF interfaces 13 for forwarding to a connected RF device, and
- to convert one or more RF input signals received at the RF interfaces 13 into a baseband output signal and to forward the baseband output signal to the baseband interface 11 for forwarding to the external instrument.

Hence, the switching unit 15 can establish one or more signal paths between the baseband interface 11 and at least one of the RF interfaces 13. The course of these signal paths, e.g. the assignment of generated RF signals to individual RF interfaces 13, can be set by the switching unit 15 based on the flexible mapping. The flexible mapping can, in turn, be set via a control command from the RF apparatus, e.g. based on a user input on the RF apparatus.

In particular, the control unit 17 can be configured to adapt the mapping of the switching unit 15 based on a single control command received from the RF apparatus.

Preferably, the switching unit 15 maps RF signals received at the RF interfaces to the (digital) baseband interface 11 and vice versa. This mapping can be controlled dynamically and may comprise a signal processing. In particular, the flexible mapping may specify to which RF interface each RF signal that is generated based on a received IQ signal is forwarded and/or from which RF interfaces received RF signals are combined to an IQ signal.

The flexible mapping can be based on a defined interleaving method. The transceiver module 10 can be configured to separate a received baseband data stream into two or more modulated signals (RF signals) based on the interleaving method.

The flexible mapping can define a flexible and changeable mapping (respectively allocation) of the baseband interface 11 to the RF interfaces 13. For instance, once a certain mapping is set, it can be maintained statically for a longer period of time until the transceiver module 10 is reconfigured, e.g. via a control command.

The baseband interface 11 is preferably a bidirectional interface, i.e. an interface capable of transferring baseband signals in both directions. For instance, the baseband interface 11 can be a high speed digital interface for data transmission.

The baseband interface 11 can be an Ethernet interface, at least on a physical level. The baseband interface 11 can operate according to a dedicated protocol suitable for baseband data transmission.

The baseband interface 11 can be a data interface for transferring baseband data, e.g. IQ data.

The control interface 19 can be coupled to the control unit 17 for forwarding the control commands. For instance, the control interface 19 is a further Ethernet interface.

In FIG. 1, the baseband interface 11 and the control interface 19 are depicted as separate interfaces. However, it is also possible that both interfaces are realized on a common physical interface.

The control unit 17 can be a processor, for instance a CPU based on the RISC architecture or any other type of microprocessor. The control unit 17 can be configured to control the transceiver module and, especially, the switching unit 15.

In FIG. 1, the switching unit 15 and the control unit 17 are depicted as separate components of the transceiver module 10. Alternatively, the control unit 17 can be integrated in the switching unit 15 and/or can be a component of the switching unit 15.

The one or more RF interfaces 13 can also be bidirectional interfaces, i.e. interfaces configured to transfer RF signals in both directions.

Figure 2:
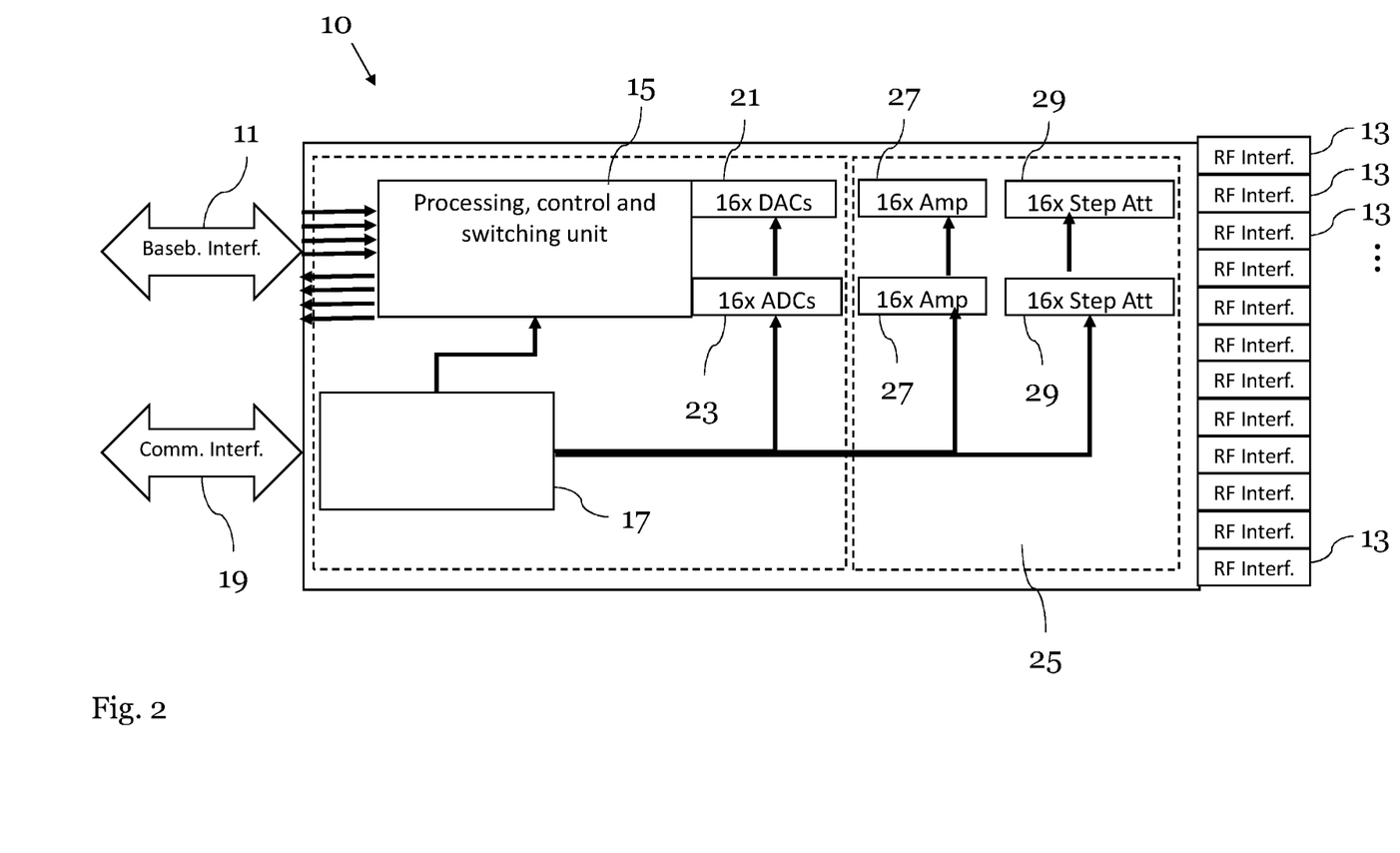
FIG. 2 shows a schematic diagram of a transceiver module according to an embodiment.

FIG. 2 shows a schematic diagram of the transceiver module 10 according to an embodiment.

The switching unit 15 can comprise a field programmable gate array. However, other implementations of the switching unit 15 are possible.

The transceiver module 10, in particular the switching unit 15, may function as a digital switch matrix.

The switching unit 15 can be configured to connect the signal paths of the inputs and outputs of the module 10 (i.e., the interfaces 11 and 13) in any direction. The switching unit 15 can further be configured to process signals transferred over said signal paths.

The switching unit 15 can be configured to dynamically (de) mulitplex the received baseband data to one or more RF signals. Thereby, a bandwidth can be adapted based on the number of RF signals and/or number of RF interfaces 13 these RF signals are forwarded to.

For instance, the transceiver module 10 receives a limited number of digital IQ signals (e.g., one signal) and a control command that comprises a defined description of a relation to multiple outputs (e.g., a progressive phase relation). The transceiver module 10 then generates based on this information and the limited number of input signals a set of RF output signals (e.g., a progressive phase taper for beam steering) and/or the flexible mapping which defines the allocation of the RF output signals to the RF interfaces 13.

The baseband signal can be a digital signal. The RF signals can be analog signals.

The switching unit 15 may comprise at least one analog-to-digital converter (ADC) 23 to (up)convert a received digital IQ signal into one or more analog RF signals, and at least one digital-to-analog converter (DAC) 21 to convert one or more received analog RF signals into a digital IQ signal (i.e., to decode the RF signal to baseband data).

In the example shown in FIG. 2, the transceiver module 10 allows for 16 signal paths (channels) and, therefore, comprises 16 ADCs 23 and 16 DACs 21, one of each signal path. However, this is just an example and the number of ADCs 23 and DACs 21 may vary depending on the number of signal paths and RF interfaces 13 provided by the module 10.

In particular, each signal path provided by the switching unit 15 may contain a plurality of ADCs 23 and/or DACs 21.

The transceiver module 10 may comprise a signal processing unit 25 which is configured to additionally modify the baseband signal and/or the RF signals. This achieves the advantage that at least a part of the signal processing can be "offloaded" from the RF apparatus to the transceiver module 10.

For instance, the signal processing unit 25 can be arranged between the switching unit 15 and the RF interfaces 13 for modifying the generated and/or received RF signals. The processing unit 25 may comprise at least one amplifier 27 and/or at least one attenuator 29, e.g. one amplifier 27 and one attenuator for each signal path and/or for each RF interface 13.

The signal processing unit 25 can form a signal fader. The signal processing unit 25 may further perform a digital predistortion and/or apply a predefined signal processing to the baseband signal and/or the RF signal.

The signal processing unit 25 can be controlled by the control unit 17, e.g. based on the control commands.

The control unit 17, the switching unit 15, the signal processing unit 25, the at least one DAC 21 and/or the at least one ADC 23 can be integrated in a single chip.

The RF interfaces 13 can be formed by coaxial connectors, e.g. SMA connectors as shown in FIG. 2. However, any other type of RF connector or port is possible. For instance, the RF interfaces 13 can be DC to 4 GHz connectors that, e.g., allow for direct RF.

The transceiver module 10 of FIGS. 1 and 2 provides a modular and scalable solution to add additional channels to an RF apparatus. In particular, it detaches the transceiver (TRX) functionality from the RF apparatus, e.g. a base band unit, which can reduce RF losses, reduce interferences and allow for phase coherent transmission and reception.

Figure 3:
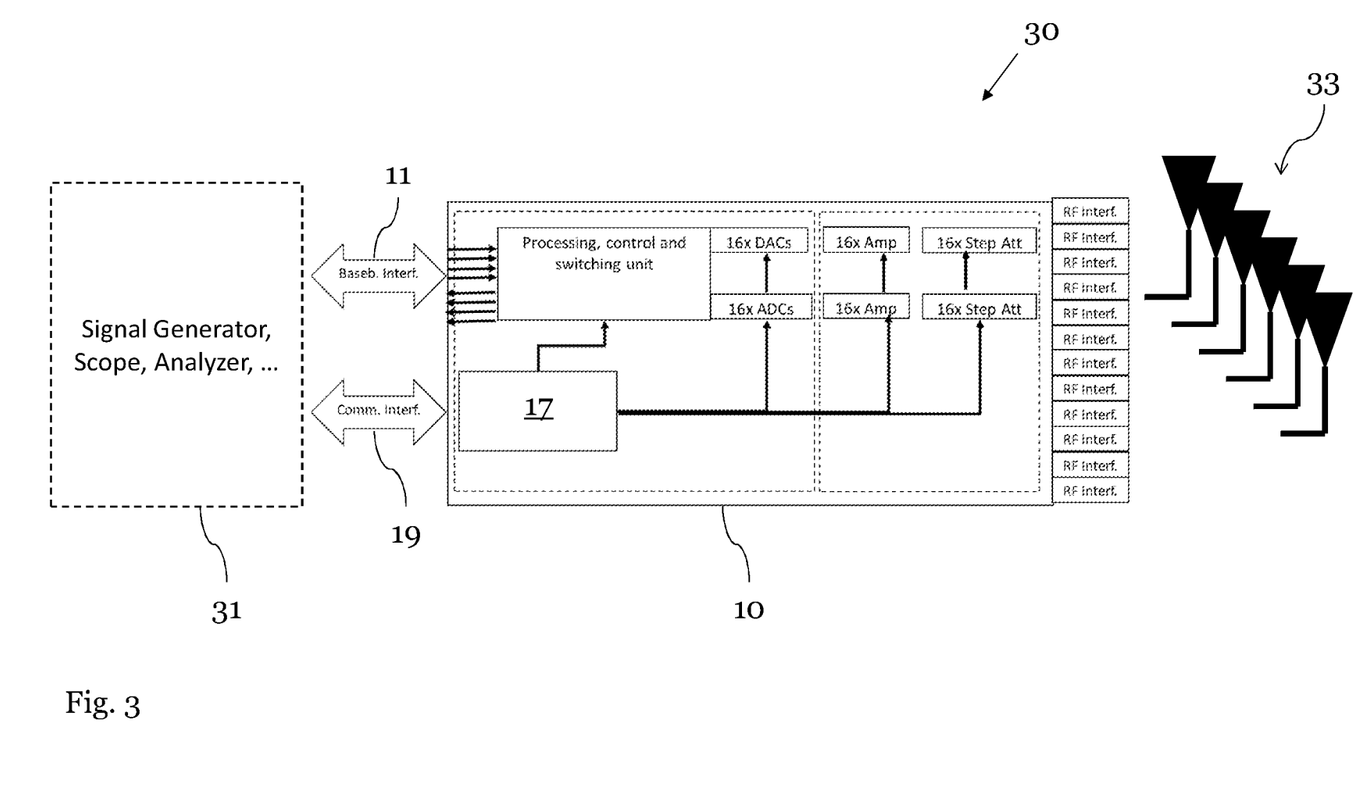
FIG. 3 shows a schematic diagram of a system according to an embodiment.

FIG. 3 shows a schematic diagram of a system 30 according to an embodiment.

The system 30 comprises the transceiver module 10, e.g. as shown in FIG. 1 or 2, and an RF apparatus 31 which is connected to the baseband interface 11 of the transceiver module. The RF apparatus 31 can further be connected to the control interface 19 of the transceiver module 10.

The RF apparatus 31 can be a signal source, a signal sink, a signal generator, an oscilloscope or a signal analyzer. In general, the RF apparatus 31 can be any electronic instrument that is configured to provide, receive and/or analyze RF signals.

A number of RF devices 33 can be connected to the RF interfaces 13 of the transceiver module 10. In the example shown in FIG. 3, the RF devices 33 are antennas.

The RF apparatus 31 can provide the baseband signal which is converted into RF signals by the transceiver module and forwarded to the connected RF devices 33 along respective signal paths. At the same time, the transceiver module 10 can be configured to forward the baseband signal based on received RF signals from the RF devices 33 to the RF apparatus 31, e.g., for further processing with the RF apparatus 31.

The RF apparatus 31 can be an RF measurement apparatus and the system 30 can be a measurement system 31 for examining and/or testing a large number of connected RF devices 33.

The RF apparatus 31 can be configured to generate the control commands, e.g. based on a user input, and forward said control commands to the transceiver module 10 via the control interface 19.

Thus, the transceiver module 10 may provide a universal solution for expanding the number of signal paths, respectively channels, offered by an RF apparatus 31 in a measurement setup. Using the transceiver module 10 can allow to maintain an existing complex signal processing chain without replacing or adding additional RF apparatuses. This can lead to a simplification and/or automation of the measurement setup.

Figure 4:
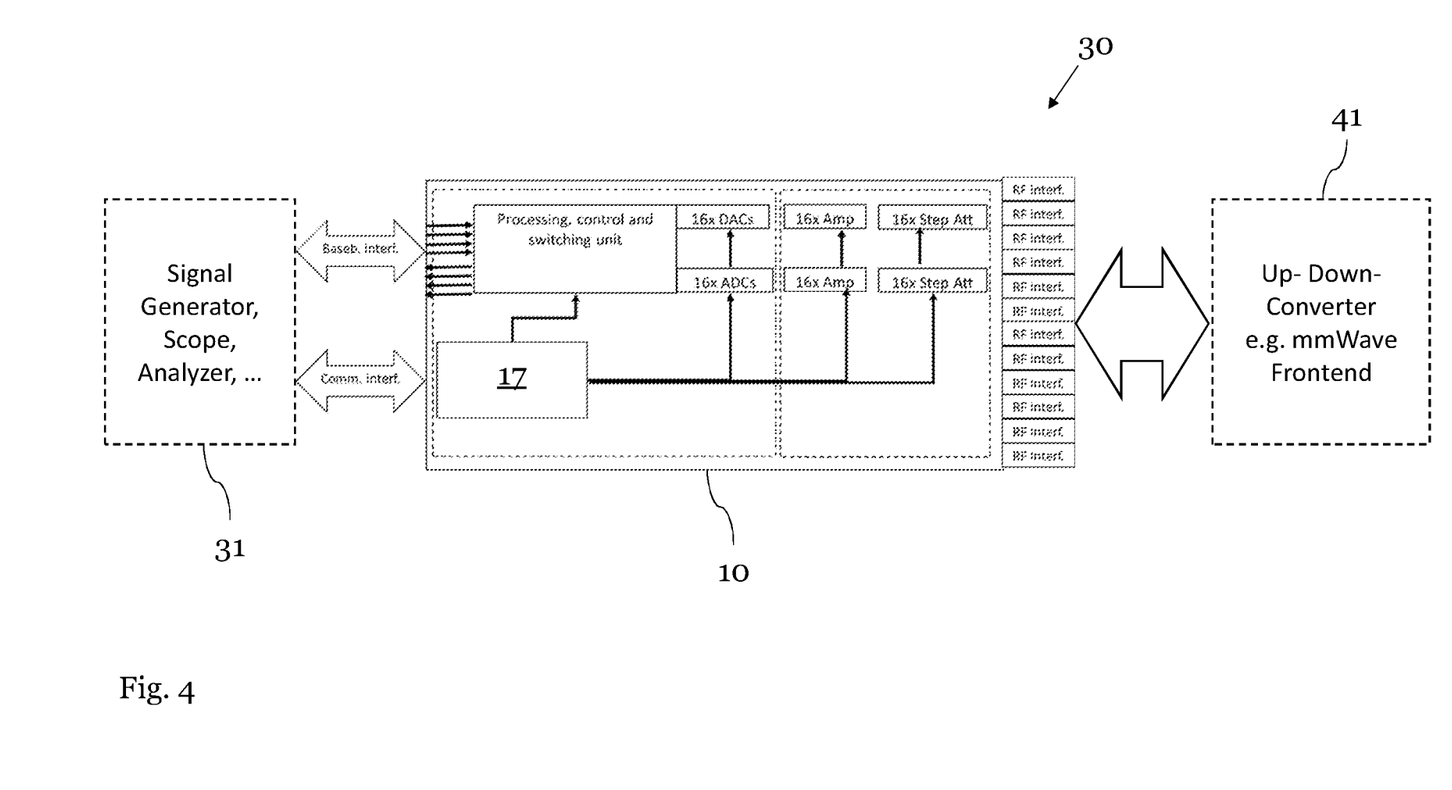
FIG. 4 shows a schematic diagram of a system according to an embodiment.
Figure 5:
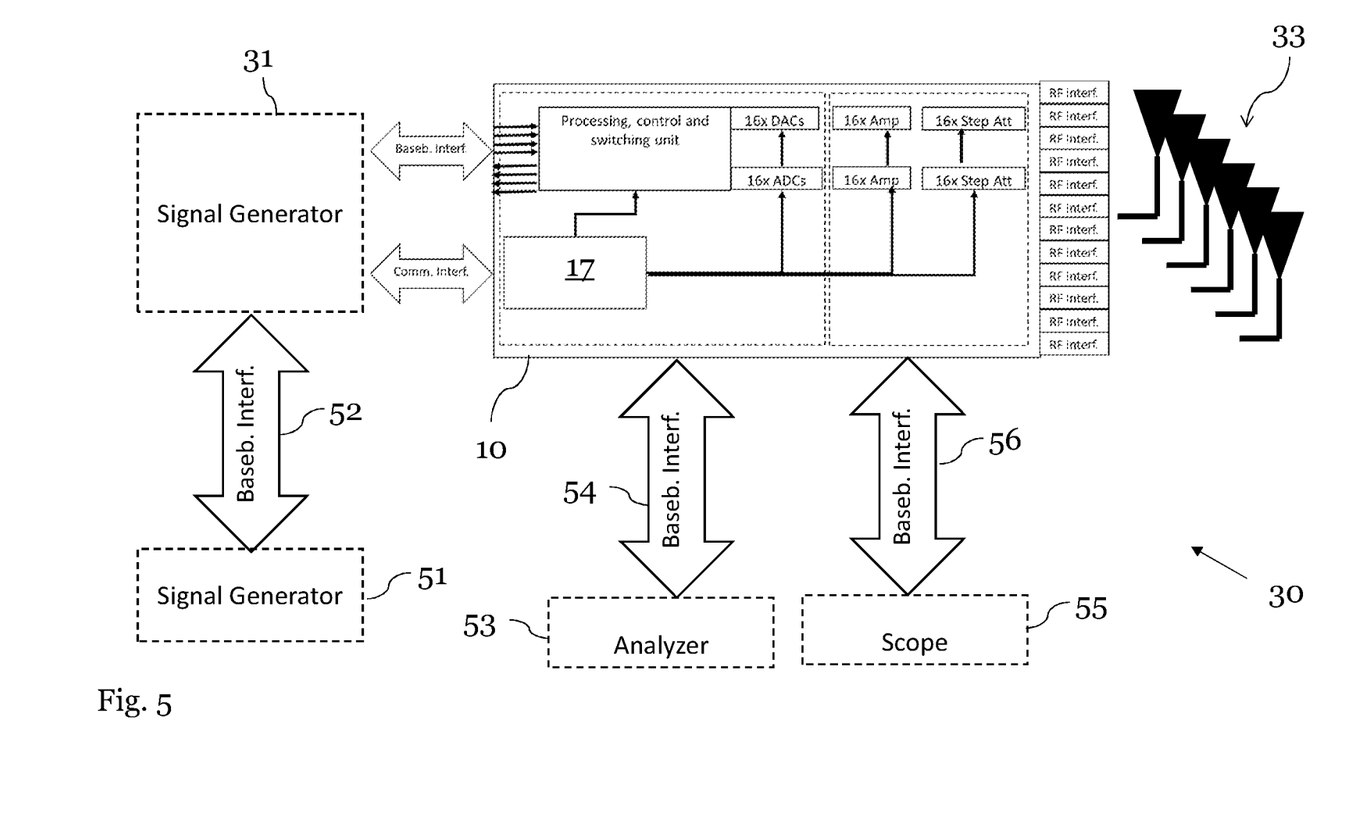
FIG. 5 shows a schematic diagram of a system according to an embodiment.

FIGS. 4 and 5 show schematic diagrams of the system 30 according to further embodiments.

FIG. 4 shows an example where and up- and/or down-converter 41, e.g. a millimeter wave (mmWave) frontend, is connected to at least one of the RF interfaces 13 of the transceiver module 10. The transceiver can exchange RF signals and/or intermediate frequency (IF) signals with the up- and/or down-converter 41.

In the system 30 shown in FIG. 5, the transceiver module 10 comprises two further baseband interfaces 54, 56 which are connectable to further RF apparatuses 53, 55 for bidirectional communication with the transceiver module 10. The further RF apparatuses 53, 55 in FIG. 5 comprise a signal analyzer and a scope. For instance, the further baseband interfaces are high speed digital IQ (HS DIG IQ) interfaces.

The further baseband interfaces 54, 56 can be configured to replicate the baseband signal or reroute a subset of the baseband signal.

In particular, the transceiver module 10 forms a multiple input multiple output (MIMO) transceiver module 10.

The transceiver module 10 can be configured to be cascadable. For instance, two transceiver modules can be connectible via one of the further baseband interfaces 53, 55, wherein one of the transceiver modules 10 is connected to the RF apparatus 31. In this way, the signal paths and RF interfaces of the RF apparatus can be expanded even more.

Furthermore, in the example shown in FIG. 5, also the RF apparatus 31 comprises an additional baseband interface 52 for communicating with a further RF apparatus 51, e.g. an additional signal generator.

Preferably, the transceiver module 10 is a modular and/or portable device which can be connected to a large number of different RF apparatuses and can be operated in different configurations.

Figure 6:
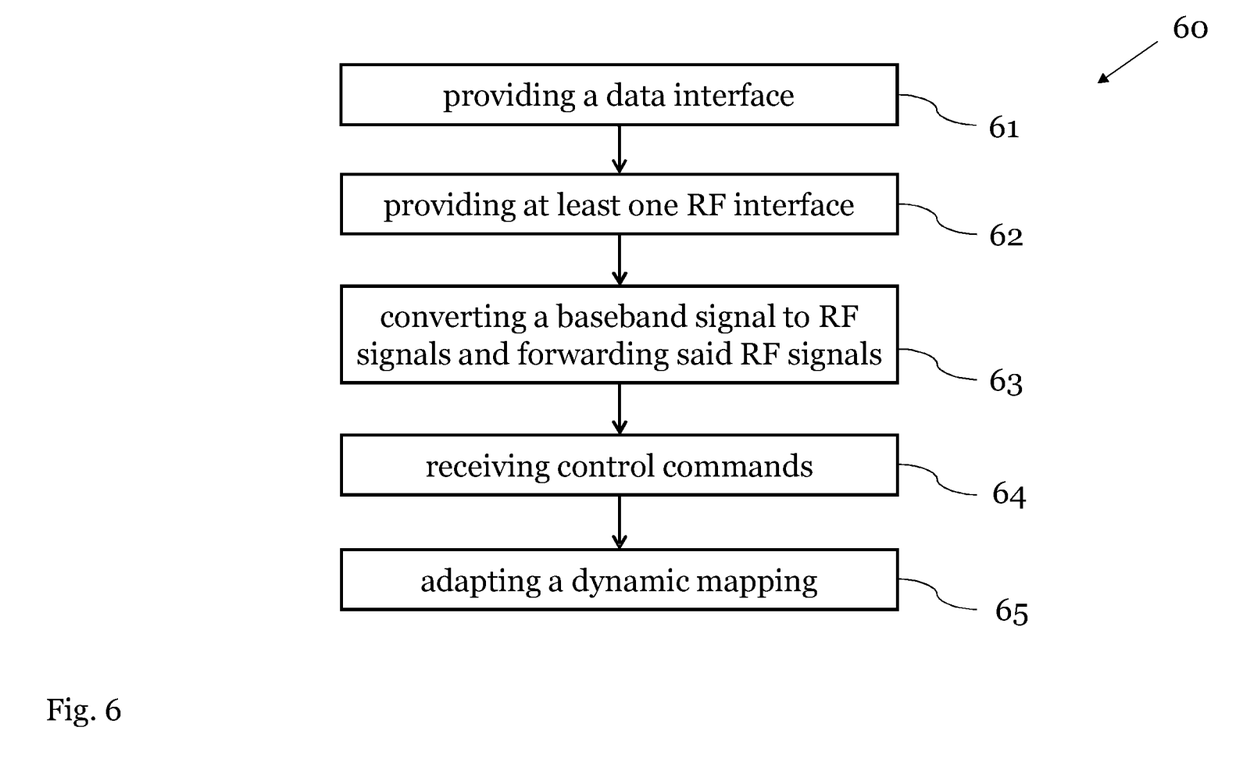
FIG. 6 shows a flow diagram of a method for connecting an RF apparatus with one or more RF devices according to an embodiment.

FIG. 6 shows a flow diagram of a method 60 for connecting the RF apparatus 31 with one or more RF devices 33 according to an embodiment. For instance, the method 60 can be carried out by any one of the transceiver modules 10 and systems 30 shown in FIGS. 1-5.

The method 60 comprises the steps of:
providing 61 the baseband interface 11 which is connectable to the RF apparatus 31 for bidirectional communication of baseband signals;
providing 62 one or more RF interfaces 13, wherein each one of the RF interfaces 13 is connectable to one of the RF devices 33;
converting 63 a baseband signal received at the baseband interface 11 into one or more RF signals and forwarding said RF signals to at least one of the plurality of RF interfaces 13 according to a flexible mapping and vice versa;
receiving 64 control commands from the RF apparatus 31; and
adapting 65 the flexible mapping based on the received control commands.

The method 60 may comprise the further step of:
additionally modifying the baseband signal and/or the RF signals, in particular by means of an RF fader.

For example, the RF signals are modified, e.g. amplified or attenuated, prior to forwarding them to the RF interfaces 13, respectively prior to converting them into the baseband signal.

The baseband signal and the control commands can be received at the same physical interface or at separate physical interfaces.

In particular, at least one signal path is established between the RF apparatus and at least one of the RF devices based on the flexible mapping.

All features described above or features shown in the figures can be combined with each other in any advantageous manner within the scope of the invention.

The invention claimed is:

1. A transceiver module for connecting an RF apparatus with one or more RF devices, the transceiver module comprising:
 a baseband interface which is connectable to the RF apparatus for bidirectional communication of baseband signals;
 one or more RF interfaces, wherein each one of the RF interfaces is connectable to one of the RF devices;
 a switching unit configured to convert a baseband signal received at the baseband interface into one or more RF signals and to forward the one or more RF signals to at least one of the RF interfaces according to a flexible mapping and vice versa;
 a control unit configured to control the switching unit; and
 a control interface which is connectable to the RF apparatus to receive control commands from the RF apparatus, wherein the control unit is configured to adapt the flexible mapping of the switching unit based on the received control commands.

2. The transceiver module of claim 1, wherein the switching unit is configured to establish at least one signal path between the RF apparatus and at least one of the RF devices based on the flexible mapping.

3. The transceiver module of claim 1, wherein the baseband interface is an Ethernet interface.

4. The transceiver module of claim 1, wherein the control interface is an Ethernet interface.

5. The transceiver module of claim 1, wherein the control interface and the baseband interface form a single physical interface.

6. The transceiver module of claim 1, wherein the transceiver module comprises at least one further baseband interface which is connectable to a further RF apparatus for bidirectional communication with the transceiver module.

7. The transceiver module of claim 1, wherein the transceiver module further comprises a signal processing unit, in particular an RF fader, which is configured to additionally modify the baseband signal and/or the RF signals.

8. The transceiver module of claim 1,
wherein the switching unit comprises at least one analog-to-digital converter and at least one digital-to-analog converter.

9. A system comprising:
the transceiver module according to claim 1; and
an RF apparatus which is connected to the baseband interface of the transceiver module.

10. The system of claim 9,
wherein the RF apparatus is any one of: a signal source, a signal sink, a signal generator, an oscilloscope or a signal analyzer.

11. A method for connecting an RF apparatus with one or more RF devices, the method comprising:
providing a baseband interface which is connectable to the RF apparatus for bidirectional communication of baseband signals;
providing one or more RF interfaces, wherein each one of the RF interfaces is connectable to one of the RF devices;
converting a baseband signal received at the baseband interface into one or more RF signals and forwarding the one or more RF signals to at least one of the plurality of RF interfaces according to a flexible mapping and vice versa;
receiving control commands from the RF apparatus; and
adapting the flexible mapping based on the received control commands.

12. The method of claim 11,
wherein at least one signal path is established between the RF apparatus and at least one of the RF devices based on the flexible mapping.

13. The method of claim 11,
wherein the baseband signal and the control commands are received at the same physical interface.

14. The method of claim 11, wherein the method further comprises the step of:
additionally modifying the baseband signal and/or the RF signals, in particular by means of an RF fader.

\* \* \* \* \*